Sept. 23, 1952     G. L. MELLEN     2,611,268
VELOCITY METERING OF GAS FLOW
Filed June 2, 1947
*Fig. 1*
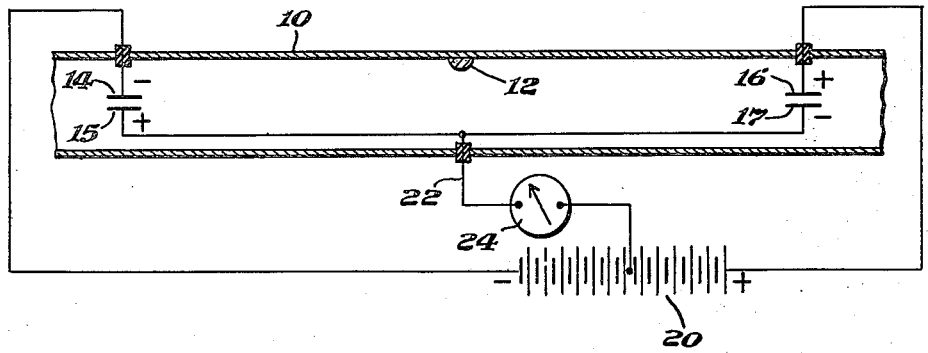
*Fig. 2*
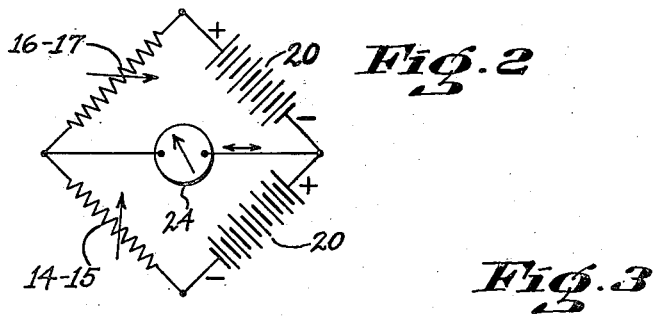
*Fig. 3*
*Fig. 4*
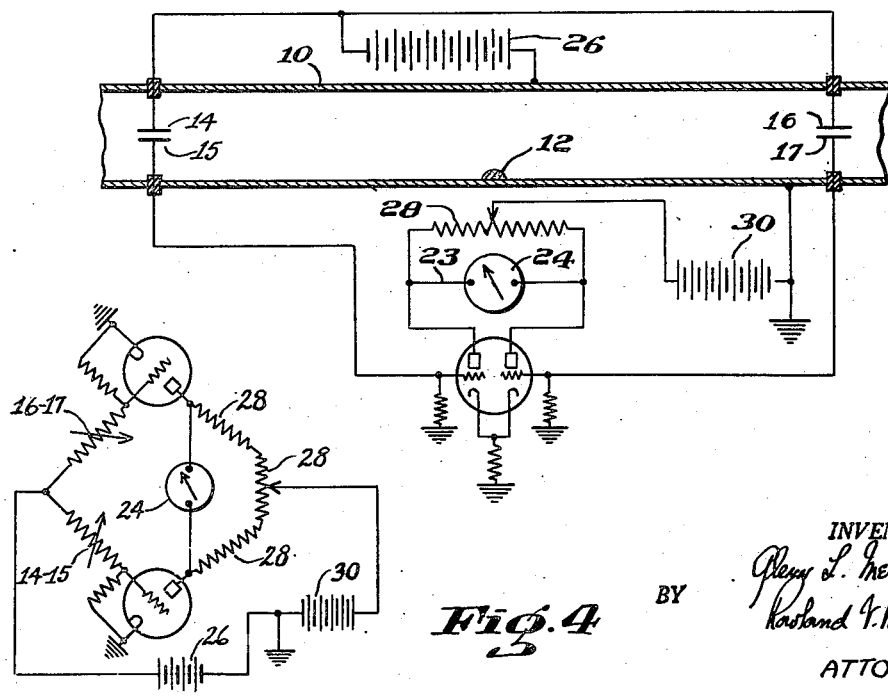
INVENTOR.
Glenn L. Mellen
Rowland F. Patrick
BY
ATTORNEY Patented Sept. 23, 1952

2,611,268

UNITED STATES PATENT OFFICE 2,611,268

VELOCITY METERING OF GAS FLOW

Glenn L. Mellen, Framingham Center, Mass., assignor to National Research Corporation, Boston, Mass., a corporation of Massachusetts Application June 2, 1947, Serial No. 751,768

6 Claims. (Cl. 73—194)

This invention relates to improved methods and apparatus for measuring the relative rate of movement of a gas.

A primary object of the invention is to provide an ionization type meter which may be applied to gas flow.

Relative gas velocity measurement and meters of this invention are based upon the principle of creating in the gaseous stream a zone of ionization wherein ions are formed at a substantially constant rate, collecting substantially all the ions so formed at two points a fixed distance apart in the zone and comparing the magnitudes of the differentials between the rates of ion collection at the respective points under conditions of no relative and relative movement between said object and said gas. The magnitude of the change in the differential can be calibrated in terms of velocity and the direction of change in the differential, i. e., whether an increment or decrement, indicates the direction of relative movement.

Thus meters of this invention may comprise a source of ionizing activity positioned to direct ionizing agents at a substantially constant rate into a gaseous stream and two sets of ion collection electrodes arranged along the stream path with such relation to the source and having such collection potentials impressed upon them as to collect substantially all the ions created in the gas by the ionizing agents. For example, with no gas flow, the ions will be collected at fixed rates at the separate sets of electrodes.

When flow conditions exist, collisions of neutral gas molecules with ions created in the zone of ionization cause a net displacement of the ions in the direction of flow, changing the rates of collection at the respective sets of electrodes from the fixed rates of collection under conditions of no flow. The current produced at each set of electrodes by ion collection is measured and the change in relative magnitudes thereof consequent upon the changed collection rates is recorded in a metering circuit. Flow velocity is calibrated from the incremental current in the metering circuit, and the direction of flow is determined from the sign thereof.

In the accompanying drawings,

Fig. 1 is a diagrammatic illustration of a meter of this invention in its simpler form associated with a section of pipe through which gas may flow, the velocity of which gas flow is to be measured;

Fig. 2 is the equivalent circuit of that shown in Fig. 1;

Fig. 3 is a diagrammatic illustration of a similar meter having a modified form of recording system having certain advantages over that of Fig. 1; and Fig. 4 is the equivalent circuit of that shown in Fig. 3.

In the drawings, 10 represents a pipe or other conduit for carrying a gas, and wherein the gas flow is desired to be measured.

12 is a source of ionizing agent activity which may be a mass of radium in equilibrium with its immediate decay products. This source 12 is adapted to emit ionizing agents, i. e., alpha particles, into the path of the gas at a substantially constant rate as the gas flows through the pipe 10 to cause ions to be formed in the gas at a substantially constant rate. Symmetrically arranged with respect to the source and connected in series are two sets of electrodes 14, 15, and 16, 17 extending into the path of gas flow in the pipe.

In the simpler form of Fig. 1, a source of potential 20 is interposed in the circuit as shown for impressing potentials across the electrode sets of a strength great enough to collect substantially all the ions produced in the gas by the ionizing agent activity of the source under conditions of no gas flow through the pipe 10. Where there is electrical symmetry, positive ions created by the ionizing agents in the gas will be collected equally at one electrode of each set, for example, at electrodes 14 and 17, which are at a negative potential relative to the other electrodes 15 and 16, and an equal number of negative ions will be collected equally at the other electrodes 15, 16 of each set, which are at a positive potential relative to electrodes 14 and 16, thus producing potentials of equal value at the terminals of a meter 24 interposed in a shunt 22. As shown, the shunt is a common shunt across the sets of electrodes tapping the source of potential 20 centrally. The equivalent circuit is shown in Fig. 2, whereby it will be seen that under conditions of equal rate of ion collection at the electrode pairs 14, 15, and 16, 17, no current will flow through meter 24.

If, however, there is a flow of gas in the pipe 10, the displacement of ions along the pipe by the collision therewith of neutral molecules constituting the gas flow, for example, to the right, will cause fewer ions to be collected at the electrodes 14, 15 than are collected at electrodes 16, 17. Conversely, if the gas flow is to the left, an opposite displacement of ions will cause fewer ions to be collected at electrodes 16, 17 than at electrodes 14, 15.

The potentials at the two terminals of the meter 24 will thus differ in polarity according to which set of electrodes is collecting the greater number of ions and in magnitude according to the degree of unbalance in the collection rates. The potential differences at the terminals will cause current flow through the meter 24 of a magnitude reflecting the differential in rate of ion collection at the electrode sets and having a direction depending upon the direction of gas flow. If the meter is both calibrated and polarized, both speed and direction of gas flow is directly indicated.

In the meter of Fig. 1, accuracy is dependent upon attainment, by proper attention to the geometrical and electrical symmetry of the device, of equal, i. e. balanced, ion collection rates under conditions of no gas flow.

Where balanced collection rates are difficult to attain by resorting solely to geometrical proportioning, or where, because of varying conditions, as of pressure, in different types of gaseous streams which the device is intended to meter, it is difficult to maintain balanced no-flow collection rates at the different conditions, external means may be provided for balancing the signals produced by the unbalanced no-flow collection rates so that only signals indicating relative gaseous flow will affect the metering circuit.

Such a device is shown in Fig. 3 wherein one electrode of each set is impressed with an equal potential of similar sign from source 26 and the other electrode of each set is separately connected to one of the two grids of a duplex triode tube provided with suitable cathode and grid resistances and a potentiometer 28 connecting the plate circuits to a source of potential 30. The meter 24 is then interposed, with or without an amplification stage, in a shunt across the plate circuits. With this circuit, by suitable adjustment of the potentiometer 28 under conditions of no-flow, the terminals of the shunt 23 can be brought to equal potential regardless of a difference in the input to the two grids. The meter 24 will then, in the adjusted circuit, read zero. Any further unbalance in the respective inputs to the grids will be reflected by initiation of current flow in the metering circuit—due to the difference in potential at the terminals of the shunt—to a magnitude and in a direction depending upon the amount and location of the particular input variation. With the meter both polarized and calibrated, both direction and velocity of relative gaseous flow may be directly read.

The equivalent circuit of that of Fig. 3 is shown in Fig. 4. The two sets of collector electrodes are connected in two arms of a bridge circuit which is balanced under conditions of no-flow by proper adjustment of the potentiometer 28. After adjustment, any further unbalance caused by variation in the respective rates of collection at the collector electrodes resulting from gas flow will cause unbalance in the bridge circuit to be reflected in the meter.

Electrical rearrangement, instead of the geometrical rearrangement which would be necessary in the device of Fig. 1, is thus relied upon to restore balance if electrical electrode symmetry is not present under conditions of no-flow. Devices provided with this type of circuit do not depend for accuracy upon exact electrical electrode symmetry; they are therefore particularly useful when electrical electrode symmetry can be maintained only over a portion of a desired range of operating conditions.

Because at some finite gas velocity, a condition will be reached where all the ions created by the source activity will be collected at one electrode set to the total exclusion of the other set so that further unbalance in rate of collection between the sets is no longer attainable, velocity meters of this invention will not accurately measure velocities exceeding a velocity which, for a particular meter at a particular pressure of a particular gas, causes such ion displacement as renders impossible any further change in unbalance of ion collection between the sets of electrodes by any more rapid displacement.

Meters of this invention are obviously equally adapted for the measurement of the speed of an object moving through a gas, subject to the above limitation as to maximum measurable velocity.

I claim:

1. A meter for determining the speed of relative movement between an object and a gas, said meter comprising a source of ionizing agent activity for creating a zone of ionization in said gas in the path of said movement, a first set of electrodes spaced from said source longitudinally along said object with respect to said path of movement, a second set of electrodes spaced from said source longitudinally along said object with respect to said path and on the opposite side of said source from said first set, said electrodes of each set extending into said zone of ionization and forming ion collectors, a source of potential for creating electric fields, transversely of said path of movement, between the electrodes of each set, said electric fields being of a strength sufficient to collect substantially all the ions, passing between the electrodes of a set, which are produced in said gas by said source, and metering means responsive to the rates of ion collection at said two sets of electrodes for indicating the variation in the relative rates of ion collection at said two sets of electrodes caused by relative movement between said gas and said object, said metering means being electrically connected to said two sets of electrodes so as to compare the ion currents collected by said two sets of electrodes and being adjustable to give a substantially zero indication for no relative movement and having a substantially linear response within the operable range of said meter.

2. A meter as claimed in claim 1 wherein the two sets of electrodes are connected in a bridge circuit, said bridge circuit containing components for balancing the bridge circuit when the rates of ion collection at the two sets of electrodes differ under conditions of no relative movement between said gas and said object, and wherein the metering means includes a meter in said bridge circuit for indicating any further unbalance in the bridge circuit.

3. A meter as claimed in claim 1 wherein said metering means includes means for separately amplifying currents resulting from collection of ions at said two sets of electrodes, means for balancing said amplified currents so that said currents are equal when there is no relative movement between said gas and said object, and means for measuring unbalance between said amplified currents resulting from relative movement between said gas and said object.

4. A meter as claimed in claim 1 wherein said two sets of electrodes are positioned substantially the same distance from said source and are arranged to collect substantially equal numbers of ions when there is no relative movement between said object and said gas.

5. A meter as claimed in claim 1 wherein said metering means includes a polarized meter for indicating direction of relative movement as well as speed of relative movement.

6. A meter as claimed in claim 1 wherein said source comprises radium in equilibrium with its immediate decay products.

GLENN L. MELLEN.

REFERENCES CITED

The following references are of record in the file of this patent:

UNITED STATES PATENTS

| Number | Name | Date |
|---|---|---|
| 1,411,796 | Meyer | Apr. 4, 1922 |
| 1,808,709 | Blake | June 2, 1931 |
| 2,136,991 | De Blois | Nov. 15, 1938 |

FOREIGN PATENTS

| Number | Country | Date |
|---|---|---|
| 117,920 | Great Britain | Aug. 15, 1918 |
| 483,166 | Germany | Sept. 27, 1929 |
| 520,484 | Germany | Feb. 19, 1934 |